July 5, 1966 J. RABINOW ETAL 3,259,883

READING SYSTEM WITH DICTIONARY LOOK-UP

Filed Sept. 18, 1961 3 Sheets-Sheet 1

INVENTOR.
Jacob Rabinow
BY Arthur W. Holt
Joseph C. A. Genovese &
Max L. Libman
Attorneys

READING SYSTEM WITH DICTIONARY LOOK-UP

Filed Sept. 18, 1961 3 Sheets-Sheet 2

INVENTOR.
Jacob Rabinow
BY Arthur W. Holt
Joseph A. Genovese &
Max L. Libman
Attorneys

READING SYSTEM WITH DICTIONARY LOOK-UP

Filed Sept. 18, 1961 3 Sheets-Sheet 3

INVENTOR.
Jacob Rabinow
BY Arthur W. Holt
Joseph A. Genovese &
Max L. Libman
Attorneys United States Patent Office 3,259,883

Patented July 5, 1966

3,259,883

READING SYSTEM WITH DICTIONARY LOOK-UP

Jacob Rabinow, Takoma Park, and Arthur W. Holt, Silver Spring, Md., assignors, by mesne assignments, to Control Data Corporation, Minneapolis, Minn., a corporation of Minnesota Filed Sept. 18, 1961, Ser. No. 138,776
19 Claims. (Cl. 340—146.3)

This invention relates to reading machine systems, and particularly to systems used to identify words by recognizing the individual characters of the words.

In the past ten or fifteen years, effort has been intensified in developing new techniques and machines for recognizing individual characters. Although the need for reading machines is now so well established that it need not be discussed, it is noted that parallel efforts have been made in developing machines to recognize characters by both optical and magnetic practices. The present invention is subsequently described in terms of optical devices, although the principles of the invention apply equally well to magnetic character readers.

Successful machines of which we are aware, recognize individual characters and produce outputs (usually electrical) identifying the characters. There have been a smaller number of attempts to recognize words, as opposed to the individual characters of which the word is composed. The S. F. Reed Patent No. 2,905,927 discloses a method and apparatus for recognizing words as such, and not the individual characters of the word. The V. K. Zworykin et al. Patent No. 2,616,983 and L. E. Flory et al. Patent No. 2,615,992 disclose machines which are in the nature of word recognizers. The Zworykin and Flory disclosures relate to equipment for translating written data into sound to aid the blind. On the other hand, the Reed patent is directly concerned with word recognition in data processing pursuits.

An object of our invention is to provide a recognition system for identifying the individual characters of a word, but which relies on a dictionary look-up to ascertain the identity of the word if the reading machine is incapable of identifying one or more of its characters. In principle, we recognize a word (and hence obtain knowledge of all of the characters thereof) by identifying all of the characters of the word which the reading machine is capable of identifying, and then systematically interrogating a dictionary until we find a word or words which have all of the machine-read characters plus another character (or characters) in the place of the unknown character (or characters). The dictionary word (or words) are then fed to a utilization device such as a buffer, printer, computer, etc.

Although the Reed patent discloses a method and apparatus for recognizing words, there is a basic difference between our invention and that of Reed. Reed compares the general outline or appearance of the entire word with stored criteria. He does this by detecting the number and order of strokes falling on, above, and below the centerline of the word. If there is a missing stroke (e.g., faulty printing) in one of the characters, Reed has no way of detecting or correcting the error. Where Reed identifies an entire word by the word shape without regard for individual characters, our invention recognizes individual characters and need not resort to a dictionary look-up unless the word being read by the reading machine produces an "error" signal, which we define as an indication that one or more of the characters of the word is either not recognizable at all or recognized with low certainty.

Many prior reading machines and reading systems in general provide "error" signals when the reading machine or system is incapable of recognizing a given character. An "error" signal may be made manifest electrically and/or by other means such as by marking the document being read. The only effort that we know of to do something with the error signal other than manifest or tabulate the same, is described in the J. Rabinow Patent No. 3,181,119 where an operator manually operates a keyboard encoder to "type" in the missing character or characters. The manually provided signals are applied as outputs of the reading machine. The intellect of the operator is relied on to fill in the character or characters which the machine cannot identify. In other words, if a reading machine is recognizing individual characters, and one of the letters of a given word is blurred, the reading machine may produce an error signal. The above patent describes a system enabling an operator to manually produce an output to take the place of the output which would have identified the blurred character, so that a utilization device fed by the reading machine, will receive all of the characters of the word.

Another object of our invention is to provide automatically operative means for correcting an erroneously read character, or character reading machine failure of any other type, where the intelligence criteria to determine the identity of the unknown character are based on the characters which are correctly read by the machine.

A broader objective of our invention is to provide an error correction system for a character or characters of a word, regardless of the originating source, i.e., whether or not a reading machine is used.

A novel aspect of our invention is the technique for finding the word in the dictionary. One technique involves inserting "trial" characters into the proper position or positions of a group of identified characters for a dictionary look-up which continues until a word having the known characters plus a trial character is found. Another technique is described later. For the first technique we have means to remember the characters which are properly identified and also the positions of the character or characters which are not identified. With this remembered information we insert "trial" characters one after the other into the position of the improperly identified character to form "trial" words. A "trial" character as used herein, is a character inserted in the space which would be occupied by an unknown character of a word. A "trial word" is a word formed of known characters, i.e., those read by the machine plus one or more trial characters. The trial words are compared to the words in a dictionary for a dictionary look-up The entire dictionary may be interrogated and all words made with trial characters printed out, or we can stop the dictionary look-up when the correct word is found in the dictionary. The dictionary is preferably a high-speed magnetic storage device, for example a magnetic drum, because it is fast and offers versatility not found (or at least as easily used) in other storage devices. It is entirely possible and practical to have a drum store the entire English language in the practice of our invention.

One of the features of our invention is that we can take advantage of various peculiarities of language to reduce the interrogation time of the dictionary. Certain characters occur in the English language (and most other languages) much more frequently than others. Therefore the trial characters may be generated in the order of most frequent occurrence in the language. When we use this system, it is statistically probable that the first trial word found in the dictionary will be the correct word. Secondly, the trial characters may be generated in an order whose frequency is peculiar to specific fields such as history or law. In various fields different characters may occur more frequently than others, and we would, of course, want to insert these characters before the less-frequently used characters. When our system is used in connection with the output of a reading machine, we may take advantage of peculiarities of the reading machine. For instance, some machines such as the reading machine described in the J. Rabinow et al. U.S. Patent No. 3,104,-369 have means to generate a "doubles" error signal, i.e. where the machine has difficulty in identifying a character, but the machine does know that the character is one of two possible characters. In such a case, these two characters are inserted as trial characters one after the other, and the chances are that one of the two of these characters will be the correct character.

The other technique for dictionary look up is quite similar to the preceding but is greatly simplified. It differs by the nature of the "trial" characters. Instead of inserting one character after the other in the place occupied by the unread character, we insert "ignore" symbols, i.e. we ignore the space occupied by the unread character. Then, we examine the dictionary to find all words having all of the read characters in their proper juxtaposition, and another character in the "ignore" space which will make a word.

Little, if any, ambiguity will arise when large words are looked up in the dictionary. Probably the worst cases of ambiguity are with short words, for instance where the second letter of the word "HAT" is not read by the machine. In the technique under discussion, the words "HAT," "HIT," "HOT," "HUT" and possibly "HET" (slang) would be printed out or otherwise identified. This example is the exceptional case and all possibilities would be printed out for a human operator to select the proper word.

As we have mentioned above, reading machines which identify characters as opposed to words (the Reed patent) ordinarily have no way of knowing whether a word has been misspelled. Reading machines are simply in the nature of transducers which convert written intelligence into electrical signals identifying the individual characters. Such statistical translation is perfectly satisfactory for many uses of reading machines. However, a furthet objective of our invention is to greatly enlarge the scope of reading machines by interposing a logical function in or between the reading machine and the utilization device. The function is to rely on the intelligence of the characters capable of being read, as part of a word, for information on which to identify the character or characters which are incapable of being read by the machine.

It is not ordinarily possible for a character identification machine to perform logical functions with regard to the identity of characters in a word. For instance, if a printers proof, book, newspaper, etc., were being read by machine, the output (excluding machine errors) would identify every character as it is printed on the document. There would be no way for the reading machine to determine that the printer had made a mistake in setting up the type, the typist had made an error in typewriting a document, etc. On the other hand, one of the uses of our invention is to provide the facility for comparing each word read by the machine with a dictionary. If the word read by machine is found in the dictionary, it is safe to assume that it has been printed, typed, etc., properly.

Accordingly, a further object of our invention is to provide means for adding a logic function to a reading machine or the equivalent, enabling words to be recognized and/or checked by dictionary look-up for each word. Our system is such that if all characters of the word are properly recognized, i.e., if the reading machine or the like has produced no error signal, the entire word may pass to the buffer. On the other hand, in those cases where errors are either intolerable or most undesirable (statutes, postal city-state designations, congressional reports, books and magazines) every word may be subjected to a dictionary look-up before final printing.

Other objects and features of importance will become apparent in following the description of the illustrated form of the invention.

Figures 1, 2:
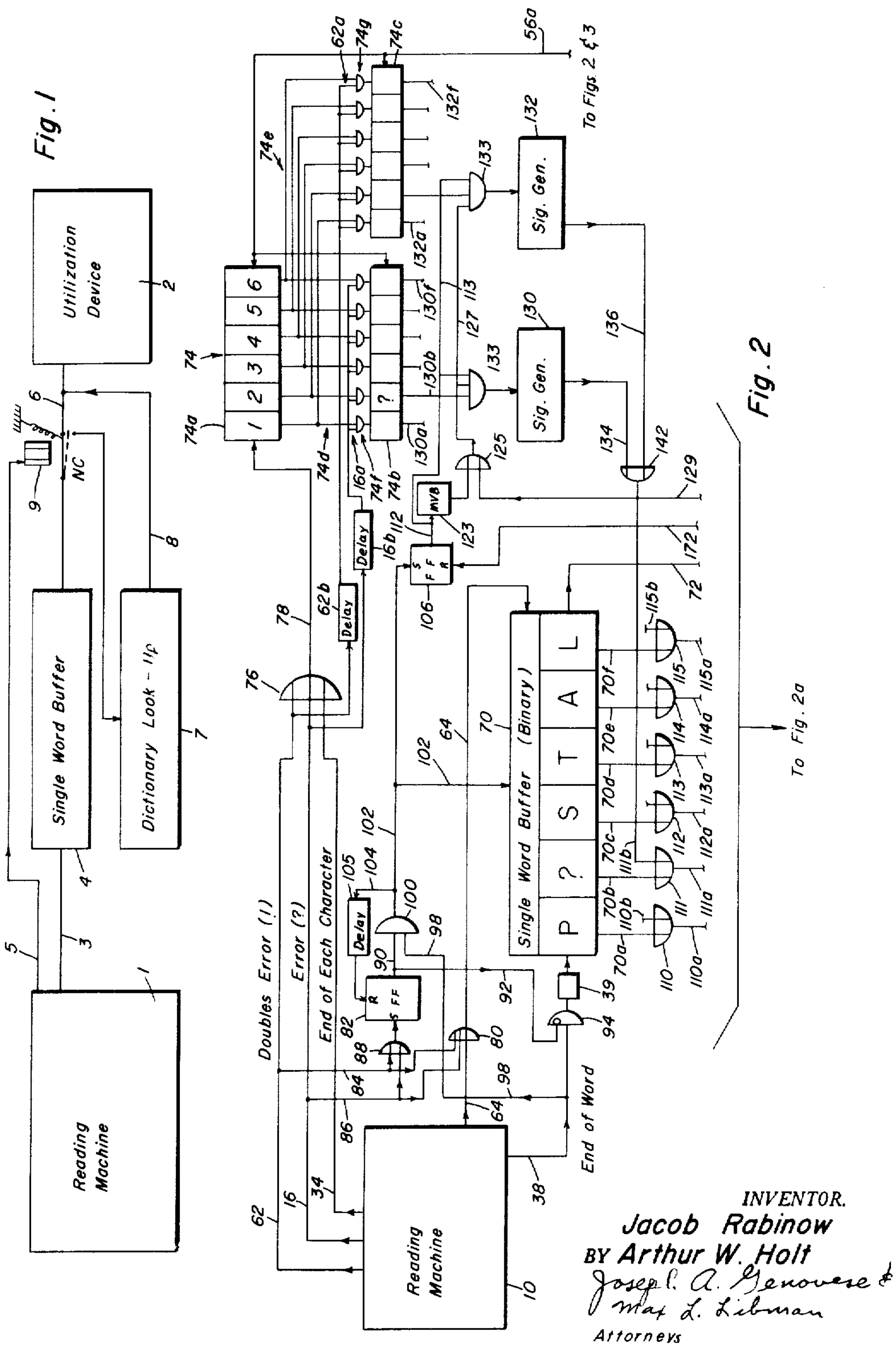
FIGURE 1 is a diagrammatic view showing only the general mode of operation of the invention in block form, and is not intended to represent machine components.
FIGURE 2 is a schematic view showing a portion reading machine system in accordance with the invention.
Figures 2A, 3:
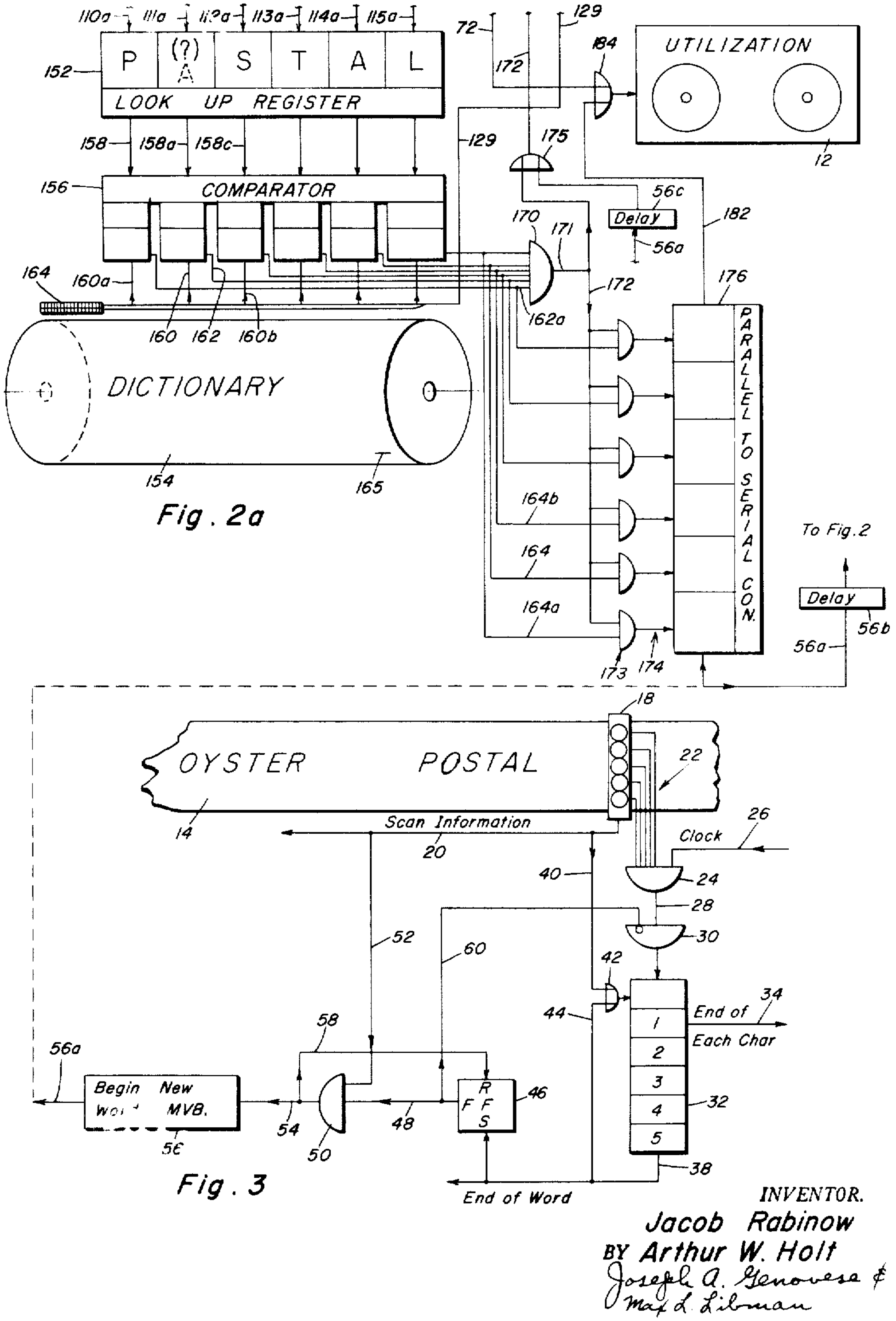

FIGURE 2*a* is a schematic view which, when connected to FIGURE 2, forms a complete system.

FIGURE 3 is a schematic view showing one way of developing various signals which are generated in different ways by some previous reading machines; FIGURE 3 also showing in detail various means to generate the same kind of signals for machines which do not have an inherent facility to produce such signals.

Figure 4:
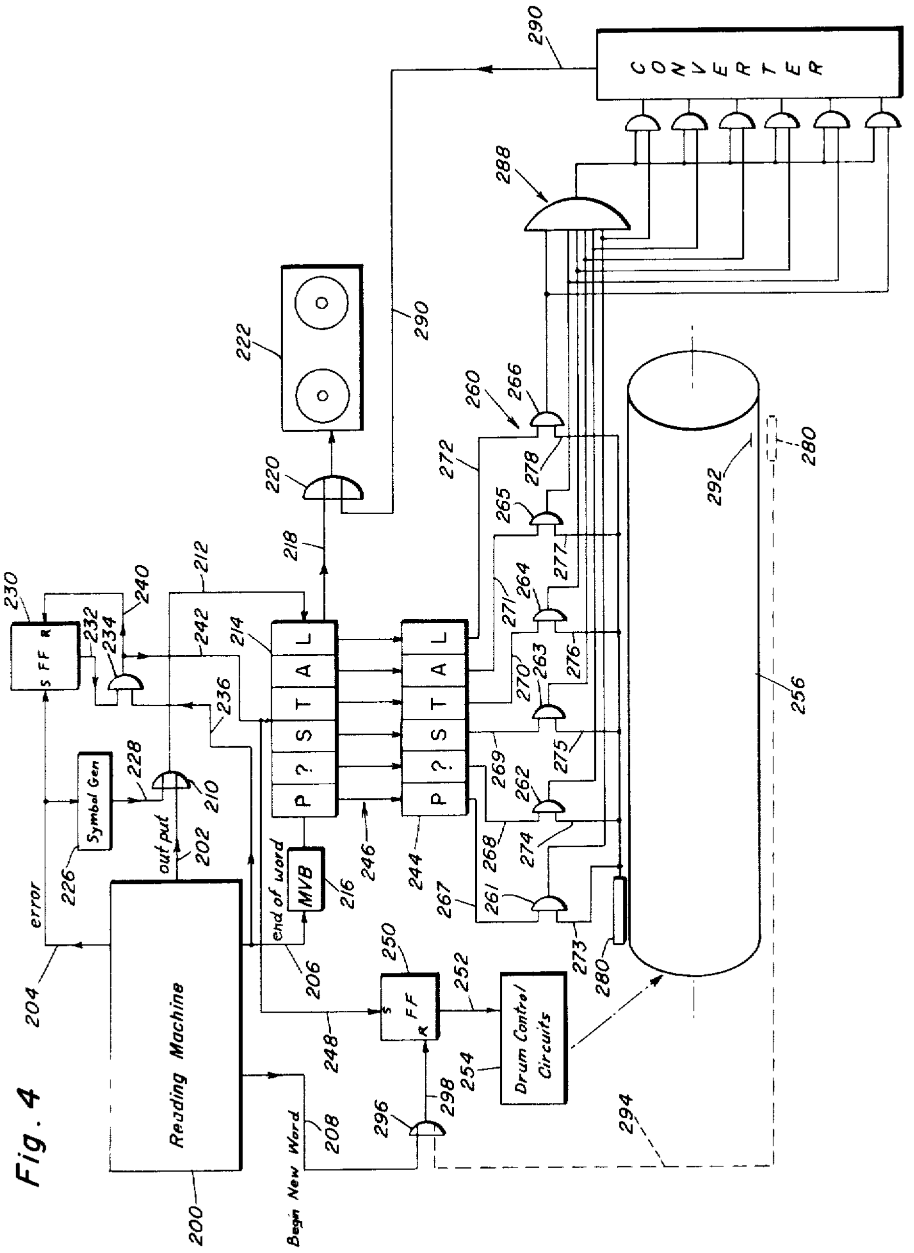

FIGURE 4 is a schematic view showing a simplified form of our invention.

*General*

FIGURE 1 shows the general procedure and technique of our invention and is not in any way intended to represent actual components of the system. Instead, we show reading machine 1 and a utilization device 2 which may be a computer, a buffer, printer, etc. The reading machine has an output line 3 feeding a single-word buffer 4. Line 5 from the reading machine is an error signal line. Thus, the reading machine provides outputs on line 3 identifying the individual characters of a word. When each character of the word has been read, the single-word buffer 4 conducts the character-identity information over line 6 to the utilization device 2. If there is an error signal on line 5 during the reading of a word, the output of the buffer 4 does not go to the utilization device. Instead, there is a dictionary look-up function represented by box 7, and the output line 8 of box 7 is fed to the utilization device 2. To show the switching, we have illustrated a relay 9 interposed in line 6 so that the buffer conducts its information to the utilization device only if there has been no error signal on line 5 during the reading of the characters of a word. If there has been an error signal, the switch section of relay switch 9 requires a dictionary look-up, and the output for the single word in question is conducted on line 8 from the dictionary to the utilization device 2. If we desire every word to be checked, the switch of relay 9 is held in the dotted line position, and all words from buffer 4 must go through a dictionary look-up at 7.

*Circuits for control signals*

FIGURES 2, 2*a* and 3 show one form of our invention and a simplified form is shown in FIGURE 4. We have illustrated reading machine 10 and 200 (FIGURES 2 and 4) and utilization devices 12 and 222 (FIGURES 2 and 4) which correspond to the reading machine and utilization device in FIGURE 1. Both reading machines may be of any design capable of providing electrical outputs corresponding to the characters which are identified. In addition, either the reading machine must produce various control signals, such as an error signal and a signal identifying the end of each character of a word, or our invention may be extended to alter or add to existing reading machines so that they are capable of providing such signals. Many of the signals being discussed are available in machines such as the reading disclosed in the J. Rabinow et al. Patent No. 3,104,369 and in the A. Holt Patent No. 3,160,855. A "doubles" error signal (Patent No. 3,160,855) is a signal indicating that the machine cannot identify the unknown character between two or more possible characters.

We have shown document 14 (FIGURE 3) with the words "OYSTER" and "POSTAL" printed thereon. The second character in the word "POSTAL" is improperly printed, and a reading machine would ordinarily be incapable of identifying this character in the word. Thus, in accordance with the operation of the reading machine disclosed in Patent No. 3,104,369 an error signal would be produced on line 16 (FIGURE 2) when the machine endeavored to identify the "O."

The generation of the error signal is part of the logic process in the reading machine described last-mentioned patent and is not described in detail here. The same holds true for the multi-photocell scanner 18 (FIGURE 3) of that machine which is partially reproduced herein as one of the many possible scanner types. We show line 20 (FIGURE 3) connected with the scanner 18 to conduct scan information signals to the logic circuits of the reading machine such as in Patent No. 3,104,369. In addition to line 20 (which represents a number of conductors) we have a group of conductors 22 (one for each photocell of the scanner and its amplifiers). The lines 22 each form a single input to a multi-input AND gate 24. Another input 26 of AND gate 24 is a clock-pulse line which may be identical to the clock-pulse line in the copending application which is used to generate scan timing. The photocells of the scanner, their amplifiers (not shown) and lines 22 are so arranged that when all of the photocells of the scanner detect "white" (the space between characters) during a clock pulse on line 26, all inputs of gate 24 are satisfied to produce an output signal on line 28. Line 28 has an inhibit gate 30 interposed therein which, for the moment, is ignored. Line 28 is connected to a multi-stage shift register 32 which steps one stage for each input signal on line 28. Accordingly, when all photocells of scanner 18 see the space between characters, the shift register 32 steps to its first position making available a signal on line 34 which is an output of the first stage of this shift register. Consequently, the signal on line 34 represents the "end of a character" (the previous character). Line 34 is also shown at the upper part of FIGURE 2. We can arbitrarily state that it requires several successive "whites" (signals on line 28) to conclude that we are scanning the space between words, as opposed to the space between characters. Thus, the shift register 32 is made with five (or more or less) stages, and it steps once for each signal on line 28. When the register has stepped all the way to the end, another control signal becomes available at the last stage of the register on line 38, and this represents "end of word." Since this signal is used in connection with our invention, we have reproduced line 38 at the lower part of the reading machine in FIGURE 2.

Register 32 must be properly reset. Thus, if the scanner 18 sees "white" for two or three scans (clock pulses on line 26) and then sees "black" (a part of a character during a clock pulse) there will be a scan information signal on line 20 corresponding to the "black" (portion of the character). Thus, the first reset line 40 for shift register 38 is connected with line 20 and to the reset terminal of shift register 32 to reset register 32 after each character. The connection of line 40 with the shift register is made through OR gate 42 with line 40 being one input. The other input of OR gate 42 is line 44, the latter being connected to "end of word" signal line 38 whereby the shift register 32 is also reset at the end of each word. It is useful to know when a new word begins. Thus, when the space between words is being scanned and we known that we have passed the end of a previous word, flip flop 46 is set by the "end of word" signal on line 38. The output line 48 of the flip flop is connected as one input of a two input AND gate 50. The other input of this gate is line 52 connected to scan information line 20. Thus, the logic is that after the end of a word, when we start to scan the next word, we have begun a "new word" which is signaled by a control signal on line 54 from gate 50. This triggers a new word multivibrator 56 to produce a signal whose function will be described later. Flip flop 46 is reset by a signal over line 58 connected with the new word signal line 54. The final precaution that we must take in connection with the development of these signals is that the register 32 be prevented from shifting after the "end of word" signal occurs on line 38 and before the "new word" signal appears on line 54. Depending on word spacing, this may by any number of scans. Therefore, we have connected line 60 from the output line 48 of flip flop 46 to the inhibit terminal of inhibit gate 30. Consequently, so long as flip flop 46 is set, "white" signals on line 28 may not pass gate 30 to actuate the shift register 32. The inhibit signal on line 60 is discontinued when the flip flop 46 is reset, i.e., when gate 50 is satisfied meaning that a new word has been reached by the scanner.

Referring to the upper left part of FIGURE 2, the "error" signal line 16 is indicated by a question mark (?). This is an ordinary "failure to read" signal such as when the reading machine tries to read the letter "O" in "POSTAL" of FIGURE 3. The reading machine described in the Rabinow application Serial No. 32,911 is capable of producing another kind of signal, termed "doubles" error. Since the means for generating this signal are described in that application, they are not repeated here. To understand this signal, though, it is a signal indicating that the reading machine cannot distinguish between a pair of characters. The reading machine may "decide" that the character is either an "F" or an an "E," an "a" or an "s," etc., but cannot be certain. Such a signal on line 62 is represented by an exclamation mark (!) and as will be described later and already previously referred to, the form of invention shown in FIGURES 2, 2*a* and 3, is capable of taking advantage of this information by trying these characters in a word context before any others. The advantage is that the identity of the unknown character is probably one or the other of the pair. The only other output (line 64) of reading machine 10 diagrammatically represents the character-identity output of a reading machine. Since our invention, described subsequently, is in terms of a binary code system, it is assumed that the output from the reading machine 10 on line 64 is in binary code. The second assumption is that reading machine 10, being for all practical purposes, a conventional machine, produces serial outputs in binary code representing the individual characters being read.

*Résumé of the reading system*

This resume refers only to major components of our system and possible slight variations. It does not include the specific connections, gating and the like, required for operative examples of our system which are described under the next sub-titles herein.

We have described how and under what conditions the control signals are produced. The signals are (1) the error signal on line 16; (2) doubles error signal on line 62; (3) end of character signal on 34; (4) end of word signal on line 38; and (5) begin new word signal on line 54. The same kind of signals are used in the embodiments of FIGURES 2–3 and FIGURE 4. The following discussion is limited to the form shown in FIGURES 2 and 2*a*.

The reading machine output line 64 is connected to a single word buffer 70 which is a conventional shift register, capable of being shifted serially or in parallel in its output mode. For convenience we shall consider all of our components, e.g., the gates, shift register 70, etc., as capable of handling binary code signals identifying individual characters. In some cases it will be desirable to handle information signals on a bit basis. However, such details of digital techniques are well known and are not considered to be necessary to understand our invention.

Buffer 70 is shown with six stages as a matter of convenience. The word "POSTAL" selected as an example, has six characters and will fill register 70. In actual practice register 70 will have more stages to accommodate both large and small words. For words smaller than the capacity of the buffer 70, the unused stages of the register must be filled with "ignore" symbols exactly as is now done in digital computer practice. Since the "ignore"

symbol generator and its control circuitry has not been invented by us, and the details thereof would materially complicate the drawings, they are omitted.

Continuing with the general summary of our system, if all characters of a complete word are identified and stored in buffer 70 over line 64, the buffer is serially shifted, and signals identifying the characters of the word are conducted on line 72 (FIGURES 2 and 2*a*) to the utilization device 12. However, if there has been an error signal on line 16 or line 62 while the characters of "POSTAL" are being identified, the relative position of the error is remembered by the position counter system 74 (upper right of FIGURE 2), and an error symbol is inserted in register 70 in place of the unknown character. When, the "end of word" control signal on line 38 is given and there has been a reading error, the register 70 is shifted in parallel to a "look-up" register 152 (FIGURE 2*a*).

We now begin a systematic examination of dictionary 154, which may be accomplished in various ways. In the system of FIGURES 2 and 2*a*, character generator 130 or 132 (FIGURE 2) inserts trial characters in the space (of register 152) which would be occupied by the unknown character had it been read. When the first trial character is inserted, for example the letter "A," the group of letters, forming a trial word "PASTAL," is compared to all of the words in the dictionary. The procedure of inserting trial characters to form trial words continues until the trial character taken with the group of recognized characters forms a word which is found in the dictionary. As will be described later, each trial word is compared by comparator 156 (FIGURE 2*a*), letter-for-letter or bit-for-bit with each word in the directionary and the trial word in the look-up register 152. When there is coincidence, the trial word is concluded to be actual word and the actual word, "POSTAL" in the example, is fed to device 12.

It is easy to change the means (not yet described in detail) which causes the single word buffer register 70 to shift serially, to require the register 70 to shift in parallel. This would require all of the words to undergo a dictionary look-up, which has the effect of verifying every character output of the reader, but on a word-context basis rather than a statistical character-by-character basis. This would also have the effect of proof-reading, at least to the extent that the machine-read characters form a word found in the dictionary.

There are many ways to construct dictionary 154 and to use it. It may be one or more magnetic tape decks (as in digital computer) or a magnetic drum (shown) or others. The magnetic drum is shown because for our purpose it offers advantages over other dictionary type storage devices. It is very fast, and the stored data can be in channels, e.g., each containing a fraction of the total number of words. Thus, if the first or first two or three characters of the word are known, e.g., the "P" in "POSTAL," the read head 164 of the dictionary drum is made to go directly to the channel containing all words beginning with "P" with a corresponding reduction in the time required for look-up. This and other expedients which are known to those familiar with magnetic storage look-up practices are incorporated as part of or refinements of our basic system.

Another way (FIGURE 4) to examine the dictionary is to insert an "ignore" symbol or otherwise ignore the intelligence (but not its position in the word) of the unknown character; then interrogate the dictionary for all of its words containing all of the known (machine-read) characters in the order of reading plus another character in place of the "ignore" symbol. If there are more than one such words, all will be read out of the dictionary. In this form of our invention the "ignore" symbol would replace or be the "trial" character discussed previously. The results obtained by either system are similar.

*Reading system (FIGURES 2, 2a and 3)*

Initially, assume that the characters of the word "OYSTER" are scanned by scanner 18 (FIGURE 3), and the scan data are conducted over the wires of cable 20 to the logic circuits of the reading machine. Since the characters in the word are well printed, each will be identified, thereby providing outputs on line 64 (FIGURE 2). These pass OR gate 80 interposed in line 64 and are serially fed to register 70. Since no error signal would occur in recognizing the characters or the word "OYSTER," the control signal on line 38 indicating the end of the word "OYSTER" will pass gate 94 (which is inhibited by an error signal) to operate multivibrator 39 whose output train of six pulses serially shifts (unloads) register 70. Gate 94 allows the signal on line 38 to pass if there is no signal (over line 92 as shown) on the inhibit terminal of the gate.

How the inhibit signal is produced is later described in connection with the processing of data concerning the word "POSTAL." The serial output line 72 of register 70 is connected with utilization device 12 via gate 184 (FIGURE 2*a*) to conduct the coded data, representing the letters of the word "OYSTER" to the device 12.

Now consider a case where a dictionary examination is required and the "trial" characters used are actual characters. The word "POSTAL" in FIGURE 3 has its second letter "O" so poorly printed that it probably would not be identified by the reading machine. The first letter "P" is clearly printed and would be identified and stored (in code) in register 70 via line 64 and OR gate 80. Note also, another function which is being performed concurrently with the identification of each character. The "end of character" signal on line 34 is OR gated at 76 to line 78 which steps counter **74*a* of the previously mentioned counter system 74. The counter system keeps track of the number and position of characters making up the word being read. Thus, when the "P" in "POSTAL" is identified the counter 74*a* steps to position 1. (During the reading of "OYSTER" the counter system 74 operated, but had no bearing on the processing of the word-character data.) When the character "O" (of "POSTAL") is scanned, machine 10 cannot identify the character and will provide an error (?) signal on line 16 which enters register 70 by way of line 86, OR gate 80 and the part of line 64 on the output side of gate 80. The "error" signal entering the register forms an "ignore" symbol (or triggers an ignore symbol generator, not shown), but occupies a stage of register 70 just as though the "O" were identified. Also, counter 74*a* is stepped one stage by the error signal being conducted on line 16 through gate 76 and over line 78. As an alternative for this function, we could rely on the end of character signal on line 34 after the "O" is scanned thereby eliminating gate 76. In either case, the stages of parallel-fed register 74*b* and 74*c* of the counter system 74 are connected to the stages of counter 74*a* by groups of lines 64*d* and 74*e*, and AND gates 74*f* and 74*g*. Lines 74*d* and 74*e* form one input to each of the groups of gates 74*f* and 74*g*, while error lines 16*a* and 62*a* form the other input of the gates of the respective groups 74*f* and 74*g*. Delays 16*b* and 62*b* are interposed in lines 16*a* and 62*a* to assure coincidence of the error signals with the outputs of the stages of counter 74*a*. Thus, if there is an error signal, its position is remembered by setting the appropriate stage of register 74*b* or 74*c*, depending on whether the error is an ordinary error (?) or a doubles (!) error. The registers 74*b* and 74*c*, and the counter 74*a* are reset by the "begin new word" signal on line 56*a* (FIGURE 3), through a delay 56*b*** (FIGURE 2*a*). In our example, then the second stage of register **74*b* will be set because the second letter of the word "POSTAL" causes the reading machine to yield an error signal on line 16. We remember the position of the unknown, i.e., non-identified, character to know where to insert trial characters, i.e., letters of the alphabet in the given example, or ignore symbols when the subsequently described technique (FIGURE 4) is used. We remember the kind of error, i.e., "error" or "doubles" (by setting register 74_b_ or 74**_c_) to know in what order and which trial characters to insert.

When an error signal occurs on lines 16 or 62, flip flop 82 (FIGURE 2) is set by way of the error signals being conducted over lines 84 or 86 to OR gate 88 and then to the flip flop 82. The output line 90 of the flip flop 82 is AND gated at 100 with the "end of word" signal conducted on line 98 (attached to line 38) so that the output line 102 of gate 100 conducts no signal until the end of the word. Meanwhile (while the letters "STAL" are being identified) the flip flop output on line 90 ahead of gate 100 is conducted on line 92 to the inhibit terminal of gate 94. This assures us that the "end of word" signal will not serially shift the word-register 70. On the contrary, the "end of word" signal on line 38 is conducted over line 98 to satisfy gate 100 and provide a signal on line 102 which is applied to two points. They are the parallel shift terminals of register 70 and the set terminal of flip flop 106.

The signal on line 102 is also conducted over line 104 through delay 105 to reset flip flop 82. When register 70 is shifted (parallel shift) the data stored in each stage is conducted on the lines 70_a_–70_f_ inclusive to OR gates 110–115 whose output lines 110_a_–115_a_ inclusive are connected to the respective stages of look-up register 152 (FIGURE 2_a_). In our example, the "P" will be sorted, but the second stage of register 152 will store no character because of the "ignore" symbol in stage "two" of register 70. We insert a succession of trial characters in stage "two" of register 152 by way of OR gate 111 (FIGURE 2).

Each of gates 110–115 inclusive has an input 110_b_–115_b_, only one of which is fully shown because all are identical. Gate input 111_b_ is the output of OR gate 142 whose two inputs on lines 134 and 136 are from the trial character sequence generators 130 and 132 respectively. Thus, if either generator were operative, the trial characters would get to stage "two" of register 152 in the same way (through gates 142 and 111).

As previously pointed out, we remembered the position of the unknown character in the word by setting the corresponding stage of register 74_b_. Thus, only line 130_b_ of the parallel outputs 130_a_–130_f_ of register 74_b_ will conduct a signal. All outputs 132_a_–132_f_ of register 74_c_ conduct no signal because the error was not a "doubles" error. Each of lines 130_a_–130_f_ and 132_a_–132_f_ can have separate sequence generators or we may have only generators 130 and 132 whose outputs are gated to only one output channel corresponding to the remembered position of the unknown character in registers 74_b_ and 74_c_. For simplicity, assume that each output line 130_a_ to 130_f_ has a sequence generator, but the only one we are concerned with is our example of the generator which inserts trial characters into register 152 (FIGURE 2_a_) via gate 111. All other characters of the word "POSTAL" were identified and thus, only line 130_b_ (of group 130_a_–130_f_) conducts a signal.

A group of three-input AND gates 133 (only two shown) have the output of flip flop 106 on lines 112, 113 as one input to each, and another input of each is one of the respective outputs 130_a_–130_f_ and 132_a_–132_f_. The final input of each gate 133 is a signal obtained from one of two sources. One shot multivibrator 123 is interposed on line 112 ahead of OR gate 125 whose output line 127 is connected to gates 133. Thus, when the flip flop 106 is set (at the "end of word" signal), the one shot multivibrator 123 provides a pulse through OR gate 125 on line 127 which satisfies one gate 133 (in the POSTAL example) causing the sequence generator 130 to provide two successive signals. The first is a blanking or clear signal to clear the second stage of register 152, of the "ignore" symbol (if this is necessary), and the second signal represents the first character of a sequence. The blanking signal will differ depending on the type of register 152. If it is digital, the blanking signal can reset the stage to zero or all zeros for all bits of the binary code stored therein. If it is magnetic tape, the blanking signal can be an erase signal. Regardless of the nature of register 152, the one shot multivibrator provides the signal for causing the sequence generator to provide the first trial character to gate 111 and then to the correct stage of register 152 to prepare it for a dictionary look-up (described later). Subsequent trial characters are inserted as needed, i.e., when the head 164 of dictionary drum 154 has examined the entire drum and found that the trial word is not stored in the dictionary. Explicitly, head 164 (or a special section thereof) will reach a strobe signal mark 165 stored at the end of each channel or only the last channel of the drum, and produce a strobe pulse on line 129. Line 129 is connected to OR gate 125 whereby the strobe pulse (or another signal triggered by it) satisfies one of the gates 133 to again operate the sequence generator 130. This procedure is repeated until a trial character is inserted in the register 152 and forms a trial word which is found in the dictionary. Upon discovery of such a word, the flip flop 106 is reset by a signal on line 172 (described later).

We have mentioned the dictionary look-up but have not yet described the details thereof. The look-up register 152 is connected with the stages of a comparator 156 by way of lines 158, 158_a_, 158_b_, etc.

There is one line connected between a single stage of register 152 and one stage or section of comparator 166. The comparator is made of AND gates, for instance, a typical gate having line 158_a_ as one input, line 160 as the other input, and an output line 162. Line 160 is connected with the read head 164 of the magnetic drum dictionary 154. Lines 160_a_, 160_b_ etc., are also connected to the read head 164 so that the word-character information contained in the dictionary 154 is read out and applied to the comparator 156. The control circuits for the dictionary form no part of our invention and are not shown in FIGURES 2 and 2_a_. They are diagrammatically shown at the left of FIGURE 4 for the next-described form of our invention, and may be the same for FIGURE 2 and 2_a_.

Returning now to the example "POSTAL" under consideration, it is evident that then the trial word "PASTAL" is made and the dictionary examined, it will not be found therein. The same is true for the next trial word which will have the character "B" inserted in the second position, assuming an alphabetic sequence of trial characters. However, when the character "O" is inserted in the second position, there will be coincidence between all characters of the output lines 162, 162_a_, 162_b_, etc., from the comparator will conduct a signal to AND gate 170 thereby causing an output signal to appear on line 171 and 172. Parallel lines 164, 164_a_, 164_b_, etc., from the comparator output lines 162–162_a_, etc., conduct signals to a group of AND gates 173, there being one AND gate for each stage of the comparator 156. The other input of each AND gate is a signal on line 172. Thus, when the word is found in the dictionary, there will be coincidence at gate 170 and also at all gates 173 so that their output lines 174 will conduct the binary information to the parallel-to-serial converter 176, for example a shift register.

Since the word has been recognized, the signal on line 171 indicating this, is used to reset flip flop 106 via a part of line 172 and OR gate 175 so that the sequence generator or generators will discontinue providing trial characters for the look-up register 152. In case the word is not in the dictionary, we prevent the sequence generator from continually recycling through the entire sequence while the next word is being processed, by the "begin new word" signal on line 56_a_ through a delay 56_c_ and to OR gate 175. The only other function to be performed is to shift the parallel-to-serial converter 176 so that the information therein may be conducted on line 182 through OR gate 184, to the utilization device 12. The other input of OR gate 184, is, or course, line 72 taking care of the situation where there was no error in the word being read, e.g., OYSTER. The shift pulse line 186 for the parallel-to-serial converter 176 is from the "begin new word" multivibrator 56. It is permissible to wait until the beginning of the next word before shifting the data in the converter 176 to the utilization device inasmuch as the next word to be read will be stored in the buffer 70, providing ample time for this function.

*Reading system, FIGURE 4*

We have referred several times to a dictionary look up which uses an ignore symbol or otherwise ignores the identity of the unidentified character, in contrast to inserting trial characters for the dictionary look up. Such a system is simpler than the system in FIGURES 2 and 2*a*, but does not provide the advantages of insurting the "doubles" trial characters before all other, or inserting the characters in their order of the language frequency table, or a special order for a particular field, e.g., chemistry. In FIGURE 4, reading machine 200 has an information (identified characters) output line 202, an error signal line 204, an end of word signal line 206, and a begin new word signal line 208. Assume that the reading machine identifies all characters of a word, then the character-identity signals are conducted on line 202, through OR gate 210, over its output line 212 to register 214 which is the same as register 70. When the end of word signal occurs on line 206, the multivibrator 216 therein operates to serially shift the information from register 214 over line 218, through OR gate 220 to utilization device 222. All of the other circuits shown in FIGURE 4 remtain idle since there was no error signal from the reading machine.

But now again consider the "POSTAL" example as it applies to FIGURE 4. The first character "P" is read by the machine and a character-identity signal reaches the register 214 over line 202, gate 210 and line 212. The "O" will not be identified by the machine, thereby causing the machine to produce an error signal on line 204 which operates the symbol generator 226 providing an ignore symbol over line 228 to OR gate 210 which is conducted on line 212 to register 214. The ignore symbol occupies the space that would be occupied by the "O" had it been identified, thereby automatically causing he register 214 to remember the position of the unknown character in the word.

The error signal on line 204 also sets flip flop 230 whose output line 232 forms one input of a two-input AND gate 234. The other is line 236 connected to the end of word signal line 206. Thus, gate 234 is not satisfied until the end of the word POSTAL, at which the output of gate 234 is conducted on lines 240 to reset flip flop 230. The gate output is also conducted on line 242 to unload register 214 in parallel, to look-up register 244 over lines 246. In addition, the output of gate 234 is conducted on line 248 (shown attached to line 242) to set flip flop 250. The output line 252 of flip flop 250 triggers the control circuits 254 for the dictionary 256. Both the dictionary and its control circuits are conventional.

The character-identidy data and ignore symbol stored in look-up register 244 has the effect of preserving the order of the known (machine-read) and unknown (ignore) characters of the word. This group is compared to the data stored in the dictionary by means of comparator 260 composed of gates 261–266 inclusive. The comparator is the same as comparator 156 in FIGURE 2*a*. Lines 267–272 inclusive form one input to the respective gates, and lines 273–278 form the other input of the respective gates. Lines 273–278 are connected to the head sections of the drum-read head 280. Thus, as the drum is interrogated by head 280, all words stored therein which have the letters P__STAL in that order will coincide with the input information of gates 261 and 263–266 inclusive.

Gate 262 is held open, i.e., it has one of its inputs (line 268) continually satisfied by the ignore symbol stored in the second stage of register 244. Thus, any and all characters will satisfy the other input.

Each time that there is conicidence at all gates of the comparator 244, the gating 288 to the right of FIGURE 4 (same as in FIGURE 2*a*) is satisfied to yield signals over line 290, which are OR gated at 220 and fed to device 222. When the look up procedure has cycled, the strobe mark 292 on the drum is detected to provide on output signal on the magnetic head line 294 to OR gate 296 which is conducted on line 298 to reset the drum-control-circuit flip flop 250. If a new word, i.e., the word following "POSTAL," is reached by the machine 200 before the drum mark 292 is detected by head 280, the begin new word line signal on line 208 is used to reset flip flop 260 by being OR gated at 296 with line 294. Thus, the drum control circuits 256 require the dictionary interrogation to discontinue. By interposing a delay (not shown) in line 298, we can allow the dictionary look-up to continue while the new word is being identified, until the register 214 is ready to be unloaded.

It is understood that numerous other variations of our invention may be resorted to without departing from the protection of the claims. For example, the unknown word could be compared to successive entries in the drum dictionary by a best of match technique where the word is compared to the first entry (or the first entry of a preselected group thereof), and the degree of match remembered, e.g., as an analog voltage. Then when the unknown word is compared to the next entry, the next entry is remembered in place of the first entry if it is a better match (e.g. higher analog voltage), otherwise it is ignored. By successive, high speed comparisons accomplished in this way, the best match of the unknown word with the drum entries will be the remembered signal at the end of the drum interrogation or any selected portion thereof. Example of a "selected portion" would be, for example, words of a certain number of letters (if the dictionary is arranged by word-length) or all words beginning with a certain letter or group of letters where the dictionary is arranged alphabetically.

We claim:

1. A reading system for a group of characters which would form a complete word if each character were known, but where at least one of the characters is unknown, a dictionary, means to compare the known characters in their order plus a trial character for the unknown character with the dictionary and for detecting at least one word in the dictionary which has said characters in said order plus a character to match the trial character.

2. In a reading machine which ordinarily identifies individual characters of words; a system to enlarge the scope of the reading machine to identify words composed of a machine-identified characters, where at least one of the characters of the word is unknown because of failure of the machine to identify the unknown character; memory means remembering the identity and order of the identified characters and also the place of the unknown character; a dictionary; and means to compare contents of said memory means with the contents of said dictionary to provide an output when said remembered characters coincide with characters of a word in the dictionary plus a character to replace the unknown character in its relative position as remembered in said memory means.

3. A system of reading by machine which identifies individual characters of words by providing signals identifying the read characters of the words, means for producing a signal indicating an error in the identity of one of the characters of a word where other characters are correctly identified, memory means to remember the identified characters and their order of occurrence and the location of the error of the word, a dictionary, means to compare the contents of said memory means with the word-data stored in said dictionary and to provide an output identifying the word in the dictionary which coincides with all of said identified characters plus another character taking the place of said error which occurred during the reading of the word.

4. A system for identifying a word where at least one of the characters of the word is unknown, said system comprising means to successively combine trial characters with the known characters of the word to form character-groups; means to compare each character-group consisting of the known characters and a trial character with a dictionary and to provide a signal in response to a comparison which yields a word-identity.

5. The system of claim 4 and means responsive to said signal to discontinue combining trial characters with said known characters.

6. In combination with a reading machine which provides outputs identifying individual characters of a word, means providing an error signal for failure to properly identify an unknown character of the word, a buffer fed by the outputs of the reading machine and adapted to conduct character identity signals to a utilization device, means responsive to said error signal for preventing the information in said buffer from being fed directly to the utilization device, and means responsive to said error signal for initiating means to determine the identity of the word whose identified characters are in the buffer by comparing the known characters with a dictionary and determining the identity of the unknown character therefrom.

7. In combination, a reading machine providing outputs identifying each characters of a word in the order of reading, means for producing a failure signal in place of an unknown character of the word when the reading machine fails to identify a character of the word, means to ascertain the position of the reading failure in the word, a register fed by signals corresponding to the read characters of the word, means to insert a succession of trial characters into said register and in a position corresponding to the position occupied by the unknown character, a dictionary, means operative when each trial character is inserted in the register to interrogate the dictionary and determine if the trial character combined with the known characters produces a word found in the dictionary, and output means associated with said interrogation means to signify the word identified in the dictionary.

8. The combination of claim 7 and means to discontinue said succession of trial characters when said output means signifies the identification of a word in said dictionary.

9. The combination of claim 8 wherein said failure signal producing means provide one of a plurality of different types of signals to signify different kinds of failures to identify a character, and the succession of trial characters being of a type which corresponds to the kind of failure.

10. An error correction system for data processing where the data is in the form of characters making up a word but where at least one of the characters is unknown, a dictionary, means for combining a trial character with the known characters of the word thereby forming a trial word, and means for interrogating the dictionary for said trial word.

11. An error correction system for data processing where the data is in the form of characters making up a word but where at least one of the characters is unknown, a dictionary, means for combining a trial character with the known characters of the word thereby forming a trial word, means for interrogating the dictionary for said trial word, and means for providing an output identifying the trial word as the actual word when the trial word corresponds to a word in said dictionary.

12. The correction system of claim 11 wherein there are means for producing a succession of said trial words by combining successive trial characters with said known characters.

13. A word completion system for words having a plurality of known characters and at least one unknown character, means to ascertain the position of the unknown character in the word, a dictionary, means to combine a trial character with the known characters in said position to thereby form a trial word, and means to interrogate said dictionary for said trial word and provide an output if the trial word corresponds to a word stored in the dictionary whereby the intelligence of the known characters is used to determine the identity of the unknown character in the word.

14. In a reading machine system for characters arranged to form words, where there are means to provide an error signal in response to a machine failure to properly identify a character in a given word, a buffer to store data identifying the known characters of said word and a symbol for the improperly identified character, means for combining a succession of trial characters with the known character data of said buffer to replace said symbol and form a trial word for each successive trial character, a dictionary, means to compare successive trial words stored in said buffer with the words in the dictionary and to provide a coincidence signal when a trial word corresponds to a word stored in said dictionary, and said trial character combining means being discontinued when said coincidence signal occurs.

15. In a word-reading machine system which includes a reading machine, means providing an error signal when said machine fails to properly identify a character of a word, a word buffer fed by individual character-data from said machine and having output means adapted to connect to a utilization device, means providing a signal indicating the end of a word, means responsive to said signal to pass the data in said buffer over said output means provided that no error signal occurred while the individual character-data of the word was being loaded into said buffer, means responsive to said error signal followed by an end of word signal for further processing the data stored in said buffer, said further processing means including a dictionary, and means utilizing the intelligence of the known characters for examining the dictionary for a word which is likely to correspond to the unknown word and providing an output signal identifying such a word.

16. In a system for identifying words having more than one character by machine; a dictionary containing a set of reference words; means to compare a given word which may contain an error, to the reference words in said dictionary; and means responsive to the comparisons for correctly identifying the given word.

17. An error ignoring means for identifying words having more than one character; comprising a dictionary containing a set of reference words; means to compare an unknown word which may or may not contain an error such as an erroneous character, to the reference words in said dictionary; and means for identifying the unknown word not withstanding the presence or absence of an error in said unknown word, by determinig the degree of match of the unknown word with the dictionary reference words and selecting the dictionary reference word most like the unknown word.

18. A reading machine to read the characters of words, where said words are members of a predetermined group of words each containing more than one character, said reading machine providing signals defining the characters read, buffer storage means to store said character defining signals, a dictionary storing references of all of the words of the said group, comparison means comparing the words stored in said buffer storage means with the references of words in the dictionary, and means to provide correct signals based on said comparisons when the word in said buffer storage means contains an error.

19. The subject matter of claim 18 and the last-mentioned means including means to select the word reference in the dictionary which is the best match to the word in said buffer storage means.

References Cited by the Examiner

UNITED STATES PATENTS

| | | | |
|---|---|---|---|
| 2,905,927 | 9/1959 | Reed | 340—146.3 |

OTHER REFERENCES

Merkel: "Using Ferrite Cores to Recognize Words," Electronics, September 25, 1960.

Young: "Automatic Character Recognition," Electronic Engineering, January 1960.

Harmon: "Handwriting Reader Recognizes Whole Words," Electronics, August 24, 1962.

MAYNARD R. WILBUR, *Primary Examiner.*

MALCOLM A. MORRISON, *Examiner.*

DARYL W. COOK, *Assistant Examiner.*